United States Patent [19]
Otto et al.

[11] 3,957,215
[45] May 18, 1976

[54] APPARATUS FOR COMMINUTING AND MIXING OF FOODSTUFFS

[75] Inventors: Friedrich Otto, Hameln; Heinrich Tilch, Rinteln; Friedrich Köllner; Manfred Rogalski, both of Hess-Oldendorf, all of Germany

[73] Assignee: A. Stephan u. Sohne, Hameln, Weser, Germany

[22] Filed: Sept. 9, 1974

[21] Appl. No.: 504,665

[30] Foreign Application Priority Data
July 5, 1974 Germany............................ 2432289

[52] U.S. Cl. ............................................. 241/282.1
[51] Int. Cl.[2] .................... B02C 18/18; B02C 18/18
[58] Field of Search............ 241/199.12, 277, 282.1, 241/282.2

[56] References Cited
UNITED STATES PATENTS
| | | | |
|---|---|---|---|
| 2,246,054 | 6/1941 | Marty | 241/277 X |
| 2,894,551 | 7/1959 | Otto | 241/199.12 X |
| 3,411,557 | 11/1968 | Weibull | 241/282.1 |
| 3,434,518 | 3/1969 | Motis | 241/199.12 |

Primary Examiner—Granville Y. Custer, Jr.
Assistant Examiner—Howard N. Goldberg
Attorney, Agent, or Firm—Michael J. Striker

[57] ABSTRACT

A stationary bowl of the apparatus has a bottom wall, and the upright drive shaft of a motor located beneath the bottom wall extends through the same and into the interior of the bowl. A tubular member surrounds the drive shaft out of contact with the same; the other open end of the tubular member is downwardly spaced from the upper end of the drive shaft and the lower end of the tubular member is welded to a tubular collar of a support ring located beneath the bottom wall and extending into the interior of the bowl through the bottom wall outside the tubular member. A second tubular member is placed from above over the shaft and the first tubular member, surrounding the first tubular member with clearance. Cooperating engaging portions at the upper end of the shaft and within the second tubular member engage one another so as to connect the second tubular member with the shaft for joint rotation. The lower end portion of the second tubular member is formed or provided with transversely projecting tool portions, such as comminuting or mixing blades.

6 Claims, 5 Drawing Figures

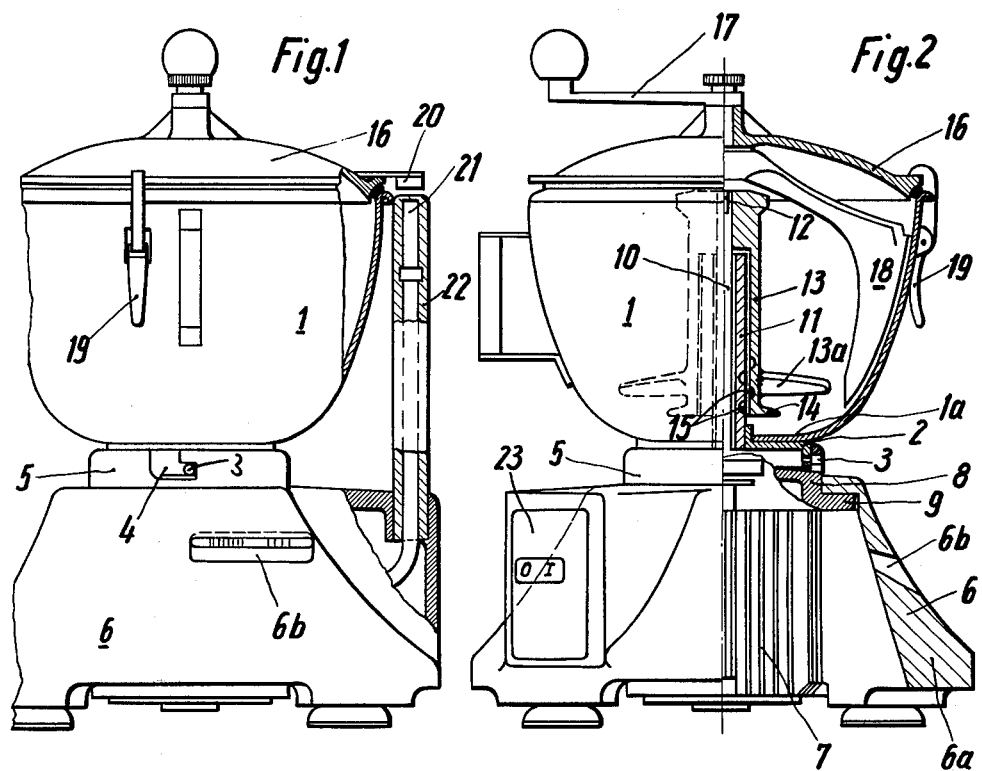
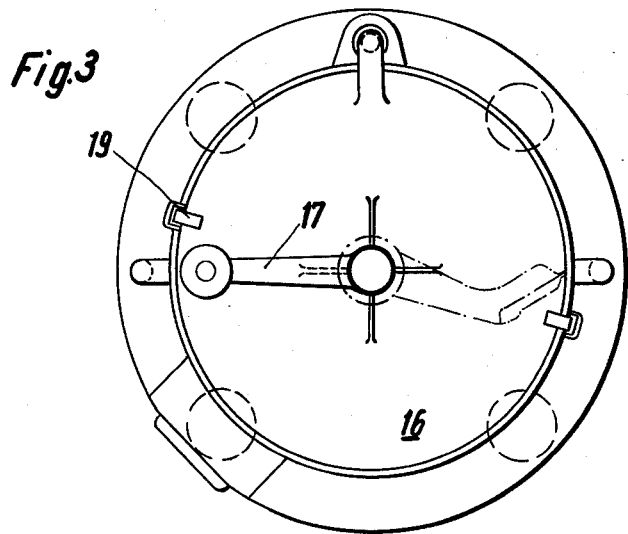

APPARATUS FOR COMMINUTING AND MIXING OF FOODSTUFFS

BACKGROUND OF THE INVENTION

The present invention relates to an apparatus for comminuting and mixing of foodstuffs, and more particularly to such an apparatus which is of the upright type.

Generally speaking, apparatuses for mixing and comminuting of foodstuffs come in two basic types, a horizontal type where the drive for the mixing arrangement in the bowl of the apparatus is located laterally of the bowl, and the upright kind wherein the drive is located beneath the bowl. The latter type, with which the present invention is concerned, is known for example from U.S. Pat. No. 2,918,956 and from U.S. Pat. No. 3,612,546. This type of apparatus requires that the drive shaft of the motor which is located beneath the mixing bowl, extend through an opening in the bottom wall of the bowl into the interior of the latter, where it is suitably connected with the mixing instrumentalities to be rotated, such as blades or the like.

The difficulty with upright comminuting and mixing apparatuses known from the prior art is that significant problems have been encountered in sealing the opening in the bottom wall through which the drive shaft extends into the interior of the bowl. Various types of seals have been utilized, including an arrangement which includes two successively arranged seals which are mounted in a plate that is constructed as a sealing flange and is threadedly connected to the bottom wall of the bowl. This latter type of seal is by far the most satisfactory of the ones that have become known from the prior art. However, it is quite complicated in its structure, and therefore not only difficult to install, but also difficult to maintain and repair. Moreover, this type of seal is subject to a substantial amount of wear.

A further drawback of the prior-art upright machines of the type in question is that because of their construction they must be relatively tall. This causes problems in certain applications, because the machine is too tall to be placed onto a table and conveniently operated, the upper open end of the machine through which material is admitted being then located too high for convenient access by an operator. On the other hand, the machines cannot be placed on the floor because they are too low for convenient operation when this is done. This requires special supporting arrangements which support the machine at an intermediate height where it can be conveniently operated. This, however, also involves additional expense and inconvenience.

Still another drawback of the prior-art machines of the type in question is that they have relatively complicated and elaborate (and hence, costly) safety arrangements whose purpose it is to switch off the drive for the comminuting instrumentalities in the interior of the bowl when the cover that is provided on the bowls of such machines, is removed. While such safety arrangements are of course highly desirable, it is equally desirable to simplify them in order to reduce the expense of constructing the machine and, not the least, in order to reduce --by reducing the complexity of the arrangement-- the possibility of malfunction.

SUMMARY OF THE INVENTION

Accordingly, it is a general object of this invention to avoid the disadvantages of the prior art.

More particularly, it is an object of the invention to provide an improved apparatus for comminuting and mixing of foodstuffs which is not possessed of the aforementioned disadvantages.

An additional object of the invention is to provide such an improved apparatus which provides for an improved seal of the drive shaft with respect to the bowl of the apparatus.

Another object of the invention is to provide such an apparatus which has an improved safety arrangement for automatically deactivating the drive when the cover of the bowl is removed.

Still a further object of the invention is to provide such an apparatus which is lower in height than other similar apparatuses of the type in question.

In keeping with the aforementioned objects, and with others which will be apparent hereafter, one feature of the invention resides, in an apparatus for comminuting and mixing of foodstuffs, in a combination comprising a stationary bowl having a bottom wall and an upstanding circumferential wall. A motor is mounted beneath the bowl and has an upright output shaft which extends through the bottom wall and projects upwardly within the bowl, the output shaft having an upper end portion. A first tubular member freely surrounds the output shaft within the bowl and has a first upper open end at a level below the upper end portion of the shaft, and a first lower end which is sealingly connected with the bottom wall. A second tubular member freely surrounds the first tubular member out of contact therewith and has a second upper end connected with the upper end portion of the shaft for joint rotation therewith, and a second open lower end at a level below the first upper open end. Transversely projecting tool portions are provided on the second tubular member to rotate with the same when the shaft rotates.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side view, partially in vertical section, of an apparatus according to the present invention;

FIG. 2 is another side view, partly in section and turned through 90° with reference to FIG. 1, showing the same machine;

FIG. 3 is a top-plan view of FIG. 2;

DESCRIPTION OF THE PREFERRED EMBODIMENTS

Figure 4:
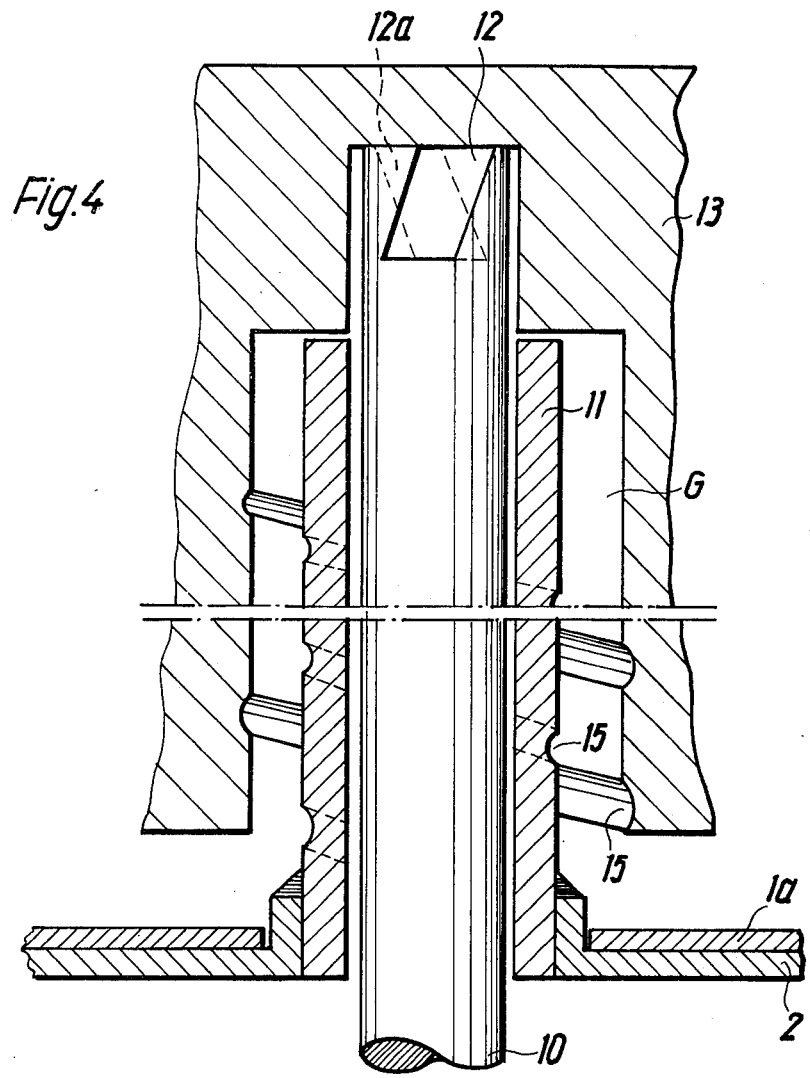
FIG. 4 is a fragmentary vertical sectional detail view, illustrating a detail of FIG. 1.
Figure 5:
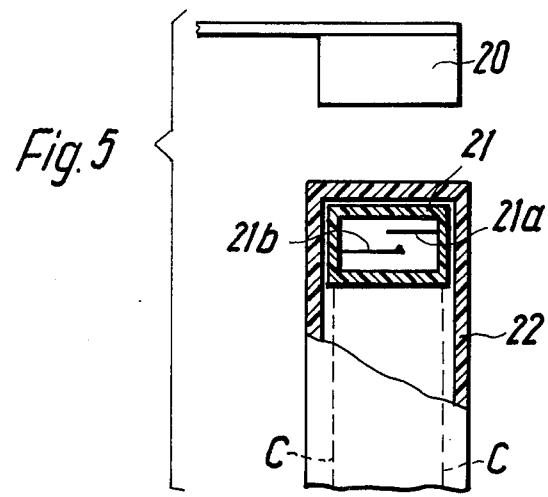
FIG. 5 is a fragmentary partly sectioned view, illustrating another detail of the embodiment in FIG. 1.

Referring now in detail to the embodiment that is illustrated by way of example in FIGS. 1-5, it will be seen that the apparatus has an upright mixing and comminuting bowl 1 which has an upper open end that is closed by a removable cover 16. The bottom wall 1a of the bowl is formed with an opening and located beneath the bottom wall is a mounting ring 2 having an upstanding center tubular portion which extends through the opening in the bottom wall 1a into the interior of the bowl 1. The mounting ring 2 may in effect be considered a part of the bottom wall 1a; it is provided with circumferentially spaced projections 3 which engage into circumferentially spaced slots 4 of a guide ring 1 provided on a support or base 6 on which the bowl 1 is supported. The projections 3 and slots 4 cooperate with one another in the manner of a bayonet closure, as is clearly evident from FIG. 1.

Mounted in the interior of the base 6 is an electromotor 7 which is of the fin-cooled type and requires no separate cooling arrangement, such as an impeller. The drive shaft 10 of the motor 7 has an upright orientation and extends through the opening in the ring 2 and in the bottom wall 1a into the interior of the bowl 1. The upper bearing plate 8 of the motor 7 is so constructed that its flange 9 permits a connection to the support 6. In addition, the bearing plate 8 is provided with or has secured to it the centrally located guide ring 5 for the bowl 1.

Located within the interior of the bowl 1 is a tubular member 11 which extends through the opening in the bottom wall 1a and into the tubular collar of the ring 2. The tubular member 11 is welded to the collar of the ring 2, as shown in FIG. 4. However, it could also be directly welded to the bottom wall 1a of the bowl 1, in which case it would be necessary to separately secure the ring 2 to the bottom wall 1a. In any case, the connection of the tubular member 11 with the ring 2 thus assures a completely tight seal. The ring 2 might also be omitted and the projection 3 be provided directly on the bottom wall 1a.

The upper open end of the tubular member 11 is located approximately at the maximum permissible filling level for the bowl 1, and the upper free end of the shaft 10 extends upwardly beyond this end of the tube 11 and is formed with two or more circumferentially spaced flats 12 which, as shown in FIG. 4, are advantageously slightly circumferentially inclined in downward direction, and which cooperate with similarly inclined flats 12a formed in the interior of a further tubular member 13 that is placed from above over the upper end of the shaft 10 and which surrounds the tubular member 11 with clearance to form therewith a gap G. It should be noted that the size of this gap G is exaggerated in FIG. 4, to permit a clearer illustration of the additional features which will be described later. As far as the flats 12 and 12a are concerned, it will be understood that for each flat 12 on the outer circumference of the shaft 10 there is a cooperating flat 12a on the inner circumference of the bore in the member 13. In FIG. 4 the flat 12a that is shown in broken lines will overlie a corresponding flat 12 of the shaft 10 at the side of the shaft which faces away from the viewer of FIG. 4. Another flat 12a will overlie the flat 12 that is visible in FIG. 4. By having the flats 12, 12a inclined circumferentially downwardly in the manner shown, rotation of the shaft 10 and of the tubular member 13, which latter carries at its lower end the projecting tool blades 13a and agitating fins 14, exerts a constant axially downwardly acting force component on the member 13, so that no separate means is necessary to prevent the member 13 from rising upwardly with reference to the shaft 10. It is understood, therefore, that the member 13 is simply freely placed onto the shaft 10 without requiring any separate connecting devices other than the cooperating flats 12, 12a. It should also be understood that the flats could be configurated differently, if desired.

The shaft 10, the tubular member 11 and the tubular member 13 together form a labyrinth-type seal which requires no separate sealing elements and is not subjct to any wear. In order to more reliably prevent the entry of material into the gap G and its rising therein in upward direction, the outer circumferential surface of the tubular member 11 and the inner circumferential surface of the tubular member 13, or either one of them, may be provided with helical grooves 15 which operate in the manner of a feedscrew and feed material that attempts to enter the gap G at the bottom end thereof, back outward, that is they feed the material back downwardly towards the open end of the gap G. The feeding effect can be increased if the grooves 15 are conically configurated in direction towards the lower open end of the gag G. In order to be able to properly show the grooves 15, the size of the gap G has been exaggerated in FIG. 4. The agitating fins 14 also aid in preventing the entry of material into the gap G, in that they tend to fling the material away from the lower open end of this gap.

The seal thus provided is not only highly reliable, but also very effective and inexpensive, and it is not subject to any wear. The height of the tubular member 13 prevents outflow of material, especially liquid media, while the machine is not in operation. On the other hand, when the shaft 10 and the member 13 rotate, the sealing effect will be enhanced by the operation of the grooves 15. Moreover, with this construction it is simply possible to lift the entire bowl 1 off the shaft 10 if and when it is desired to be able to transport it from the base 6 to some other location, even if the contents of the bowl are liquid, since, as mentioned before, the height of the tubular member 11 prevents outflow of the liquid medium. It will be recalled that the upper open end of the tubular member 11 is located at a level at least equal to or preferably above the maximum permissible filling level for the bowl 1.

On the other hand, the cooperation of the rings 2 and 5, of which the former becomes seated inside the latter, properly retains and orients the bowl 1 on the base 6, and the bayonet closure using the portions 3 and 4 prevents relative axial movements between bowl 1 and base 6, while radial movements are prevented by the cooperation of the rings 2 and 5.

When the bowl is removed, the motor 7 can be readily separated from the base 6 by simply removing a few retaining screws.

As pointed out before, the upper open end of the bowl 1 is closed by a removable cover. Located in this cover is an additional tool 18, which can be readily turned in that it is connected in a readily releasable manner with a hand crank 17 that is located exteriorly of the cover 16. The tool 18 in this embodiment is another agitating blade, but could be a different tool.

The cover 16 is held in place on the bowl 1 by means of snap latches 19 which can be disengaged by moving their curved levers upwardly (in counterclockwise direction for the one shown at the right-hand side of FIG. 2) so that their upper hook-shaped portions disengage from the rim of the cover 16. Because a removal of the cover 16 while the shaft 10 turns the tubular member 13 could lead to danger for the person removing the cover, a safety switch arrangement is provided which, however, is much simpler than what is known from the prior art. An upright tube 22 is mounted on the base 6, extending upwardly and having located in it at its upper end a reed switch 21 having the illustrated housing in which two contacts 21a and 21b are mounted. The contact 21b can flex upwardly and out of its position illustrated in FIG. 5 and is of a magnetically attractable material. Mounted on the cover 16 is an arm which carries a permanent magnet 20. As long as the permanent magnet 20 is immediately proximal to the upper end of the tube 22 and therefore to the switch 21, it exerts enough magnetic force upon the contact 21b to flex the latter upwardly into engagement with the contact 21a. The switch is connected by means of the conductors C with the power supply circuit for the motor 7 so that, as long as the magnet 20 is proximal to the switch 21, the power supply circuit is closed and power will be supplied to the motor 7. When the cover is lifted off, however, the magnet 20 recedes with the cover from the switch 21, and the contact 21b will elastically return to its illustrated position in which it is out of engagement with the contact 21a and the power supply circuit for the motor 7 is interrupted. This is a safety arrangement that is as simple as it is reliable. Switches of the type required for the switch 21 are commercially available, for example as a so-called "contactless magnet switch" from the Bernstein Company of West Germany. It will be self-evident that this safety arrangement will also work not only when the magnet 20 is moved upwardly away from the switch 21, but also when the cover 16 is slightly turned so that the magnet moves laterally away from the switch 21.

To assure greater stability for the machine it is advantageous if the bottom end portion 6a of the base 6 has a greater diameter than the bowl 1, as shown in FIG. 2, and has an increased amount of material in it, that is, that it is weighted due to the presence of a greater material thickness in the region 6a. Reference numeral 6b identifies air slots through which air can have access to the motor 7, and reference numeral 23 diagrammatically identifies a motor overload protector of known constuction.

It will be appreciated from the drawing that the machine according to the present invention can be quite low in its overall height, so that it can readily be placed upon a normal table and a person of average height will find it entirely convenient to gain access to the interior of the bowl 1 through the upper open end thereof.

It will be understood that each of the elements described above, or two or more together, may also find a useful application in other types of constructions differing from the types described above.

While the invention has been illustrated and described as embodied in an apparatus for comminuting and mixing of foodstuffs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. In an apparatus for comminuting and mixing of foodstuffs, a combination comprising a stationary bowl having a bottom wall and an upstanding circumferential wall; a motor mounted beneath said bowl and having an upright output shaft which extends through said bottom wall and projects upwardly within said bowl, said output shaft having an upper end portion; a first tubular member freely surrounding said output shaft within said bowl and having a first upper open end at a level below said upper end portion, and a lower end which is sealingly connected with said bottom wall; a second tubular member freely surrounding said first tubular member out of contact therewith and having a second upper end connected with said upper end portion of said shaft for joint rotation therewith, and a second open lower end at a level below said first upper open end; and transversely projecting tool portions on said second tubular member, said first and second tubular members having an outer and an inner circumferential surface, respectively, which define with one another an annular gap, at least one of said surfaces being formed with spiral converging grooves configurated for converging any material entering said gap in direction towards said bottom wall so that said material cannot rise upwardly in said gap.

2. In an apparatus for comminuting and mixing of foodstuffs, a combination comprising a stationary bowl having a bottom wall and an upstanding circumferential wall; a motor mounted beneath said bowl and having an upright output shaft which extends through said bottom wall and projects upwardly within said bowl, said output shaft having an upper end portion; a first tubular member freely surrounding said output shaft within said bowl and having a first upper open end at a level below said upper end portion, and a lower end which is sealingly connected with said bottom wall; a second tubular member freely surrounding said first tubular member out of contact therewith and having a second upper end connected with said upper end portion of said shaft for joint rotation therewith, and a second open lower end at a level below said first upper open end; transversely projecting tool portions on said second tubular member; a support for said bowl located beneath the latter; a guide ring on said support, surrounding the axis of rotation of said shaft and being formed with circumferentially extending slots; a mounting ring on said bowl beneath said bottom wall thereof, said bottom wall having an opening through which said shaft and said first tubular member extend, said first tubular member being welded to said mounting ring; and projections on a downwardly directed surface of said mounting ring and adapted to enter into the respective slots and to cooperate with the same to form a bayonet closure.

3. A combination as defined in claim 2, said mounting ring having a center hole bounded by an upstanding sleeve portion which extends into said opening about said first tubular member and is welded to the latter within said bowl.

4. A combination as defined in claim 2, said support having a top portion which supports said bowl and a base portion which has a diameter greater than the diameter of said bowl and is weighted.

5. In an apparatus for comminuting and mixing of foodstuffs, a combination comprising a stationary bowl having a bottom wall and an upstanding circumferential wall; a motor mounted beneath said bowl and having an upright output shaft which extends through said bottom wall and projects upwardly within said bowl, said output shaft having an upper end portion; a stationary first tubular member freely surrounding said output shaft within said bowl and having a first upper open end at a level below said upper end portion, a lower end sealingly connected with said bottom wall, and an outer circumferential surface; a second tubular member freely surrounding said first tubular member out of contact therewith and having a second upper end connected with said upper end portion of said shaft for joint rotation therewith, a second open lower end at a level below said first upper open end, and an inner circumferential surface which defines with said outer circumferential surface an annular gap; means in said annular gap for conveying any material entering said gap in direction towards said bottom wall so as to prevent the material from rising upwardly in said gap; and transversely projecting tool portions on said second tubular member.

6. In an apparatus for comminuting and mixing of foodstuffs, a combination comprising a stationary bowl having a bottom wall and an upstanding circumferential wall; a motor mounted beneath said bowl and having an upright output shaft which extends through said bottom wall and projects upwardly within said bowl, said output shaft having an upper end portion; a first tubular member freely surrounding said output shaft within said bowl and having a first upper open end at a level below said upper end portion, and a lower end which is sealingly connected with said bottom wall; a second tubular member freely surrounding said first tubular member out of contact therewith and having a second upper end connected with said upper end portion of said shaft for joint rotation therewith, and a second open lower end at a level below said first upper open end; and transversely projecting tool portions on said second tubular member, said first and second tubular members having an outer and an inner circumferential surface, respectively, which define with one another an annular gap, at least one of said surfaces being formed with spiral conveyor grooves diverging in direction towards said bottom wall so as to convey any material entering said gap in direction towards the bottom wall and to prevent the material from rising upwardly in said gap.

* * * * *